(No Model.)
C. N. SMITH.
BOLTING REEL.
No. 309,744. Patented Dec. 23, 1884.
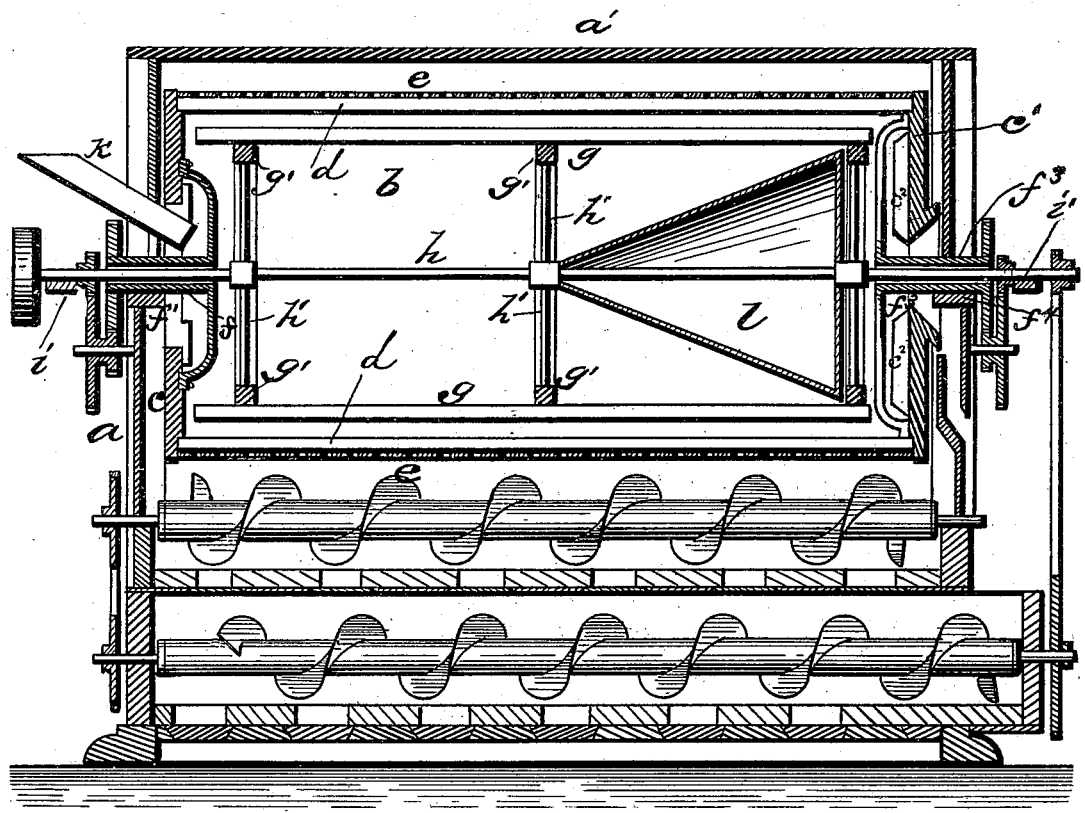
WITNESSES
E. H. Bates
Theo. Munger
INVENTOR
C. N. Smith
by Andrew Smith
his ATTORNEYS

UNITED STATES PATENT OFFICE.

CHRISTIAN N. SMITH, OF DAYTON, OHIO.

BOLTING-REEL.

SPECIFICATION forming part of Letters Patent No. 309,744, dated December 23, 1884.

Application filed November 3, 1883. (No model.)

*To all whom it may concern:*

Be it known that I, CHRISTIAN N. SMITH, a citizen of the United States, residing at Dayton, in the county of Montgomery and State of Ohio, have invented certain new and useful Improvements in Bolting-Reels; and I do declare the following to be a full, clear, and exact description of the invention, such as will enable others skilled in the art to which it appertains to make and use the same, reference being had to the accompanying drawing, and to letters or figures of reference marked thereon, which forms a part of this specification.

The figure of the drawing is a representation of a vertical longitudinal sectional view of the improved bolting-reel.

This invention has relation to bolting-reels commonly known as "centrifugal flour-bolts," and classed under the head of "bran-dusters" as "beaters;" and it consists in the construction and novel arrangement of devices, as will be hereinafter fully described, and particularly pointed out in the claim appended.

Referring by letter to the accompanying drawing, $a$ designates the frame of the machine, and $a'$ the inclosing-casing, which is made air-tight as nearly as practicable.

$b$ designates the bolting-cylinder, which is composed of two heads, $c$ $c'$, connected by stay bolts, rods, or bars $d$, and which is covered by bolting-cloth $e$, of suitable mesh, supported by suitable rings. The cylinder-frame is preferably made in sections secured to each other and to the heads. The cylinder-head $c$ of the feed end of the cylinder is provided with a hollow journal, $f$, which turns in a bearing, $f'$, secured to the frame, and the head $c'$ at the tail end of the bolting-cylinder is provided with a similar hollow journal, $f^2$, which turns in a bearing, $f^4$.

$g$ designates the rotating beaters which are arranged in the cylinder, and are secured to rings $g'$. The latter are attached to a shaft, $h$, by arms $h'$. The shaft $h$ passes through the hollow journals, and is supported in suitable bearings, $i$ $i'$. The cylinder is entirely level from the feed end to the tail end, and the twist given the wheel causes the material to pass through it.

$k$ designates the feed-spout, through which the material to be bolted is introduced.

In passing through the cylinder from the head $c$ to the head $c'$ the material is thrown by the beaters against the bolting-cloth of the cylinder, and thereby separated, the flour or fine and heavy material passing through the meshes of the bolting-cloth into the surrounding inclosed space, while the lighter particles remain in the bolting cylinder and finally arrive at the head $c'$, which is provided with radial ribs $c^2$ and a central discharge-opening.

Either or any of these parts may be varied without departing from my invention, the main feature of which is the hollow metal cone $l$, secured to the shaft $h$, and having its small end toward the head of the reel. This cone $l$ is located near the discharge end of the reel, and its base nearly fills the space between the beaters. The object of this cone is to keep the material from the center of the reel, there being a tendency in the ordinary reels to create a draft along the shaft. This the cone defeats, as I have found by experiment, and by its use I about double the capacity of the ordinary centrifugal reel, at the same time preventing flour from passing through the center of the reel and being discharged with the offal.

Having thus fully described my invention, what I claim as new, and desire to secure by Letters Patent, is—

The combination, in a centrifugal bolting-reel, of the reel having a central discharge-opening, the rotating beaters, and the deflecting-cone having its apex directed toward the head of the reel, substantially as specified.

In testimony whereof I affix my signature in presence of two witnesses.

CHRISTIAN N. SMITH.

Witnesses:
JAMES C. YOUNG,
THEODOR LIENESCH.